(12) United States Patent
Hong et al.

(10) Patent No.: US 12,417,102 B2
(45) Date of Patent: Sep. 16, 2025

(54) TECHNIQUES TO ENCODE AND DECODE FOR CHARACTER CLASS MATCHING

(71) Applicant: Intel Corporation, Santa Clara, CA (US)

(72) Inventors: Yang Hong, Shanghai (CN); Hao Chang, Shanghai (CN); Xiang Wang, Shanghai (CN); Wenjun Zhu, Shanghai (CN); Kun Qiu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 753 days.

(21) Appl. No.: 17/559,696

(22) Filed: Dec. 22, 2021

(65) Prior Publication Data

US 2022/0171628 A1 Jun. 2, 2022

(51) Int. Cl.
*G06F 9/38* (2018.01)
*G06F 9/30* (2018.01)

(52) U.S. Cl.
CPC ........ *G06F 9/3836* (2013.01); *G06F 9/30036* (2013.01); *G06F 9/30038* (2023.08)

(58) Field of Classification Search
CPC .............. G06F 9/3836; G06F 9/30036; G06F 9/30038; G06F 9/30032; G06F 9/30021
See application file for complete search history.

(56) References Cited

U.S. PATENT DOCUMENTS

| | | | | |
|---|---|---|---|---|
| 5,452,451 A | * | 9/1995 | Akizawa | G06F 16/90344 |
| 2003/0174703 A1 | * | 9/2003 | Relan | H04L 45/742 |
| | | | | 370/392 |
| 2013/0243325 A1 | * | 9/2013 | Bradbury | G06F 9/30038 |
| | | | | 382/182 |
| 2015/0116136 A1 | * | 4/2015 | Cameron | H03M 7/00 |
| | | | | 341/55 |
| 2017/0134044 A1 | * | 5/2017 | Lyle | H03M 7/3082 |
| 2021/0208888 A1 | | 7/2021 | Chang et al. | |

OTHER PUBLICATIONS

Wang, Xiang et al., "Hyperscan: A Fast Multi-pattern Regex Matcher for Modern CPUs", This paper is included in the Proceedings of the 16th USENIX Symposium on Networked Systems Design and Implementation (NSDI '19), Feb. 26-28, 2019, Boston, MA, USA, 19 pages.

* cited by examiner

*Primary Examiner* — Farley Abad
(74) *Attorney, Agent, or Firm* — Compass IP Law PC

(57) ABSTRACT

Examples include techniques to encode and decode for character class matching. A character class including a plurality of characters may be encoded in a mask table. A sampled chunk of input data is used to perform a decode operation to check, in a parallel manner, each character included in the input data with the encoded mask table. The checking of each character in the input data to determine whether at least one character in the input data matches a character included in the character class.

13 Claims, 11 Drawing Sheets

G-Model Decoding Scheme 600

G-Model Decoding Pseudocode 605

1. // data and mask preparation
2. chars = VMOVDQA(input);
3. low6bits = VPBROADCASTB(0x3f);
4. 
5. // do the real work
6. c_lo = VPERMB(chars, mask_lo);
7. c_hi = VPSHUFB(mask_hi, VPRSRLQ(VPANDNOT9low6bits, chars), 6));
8. t = VPAND(c_lo, c_hi);
9. res = CHECK(t);

F-Model Encoding Scheme 800

F-Model Encoding 810

| | 00 | ... | 30 | 31 | 32 | 33 | 34 | ... | 68 | 69 | 6A | 6B | 6C | ... | 7F |
|---|---|---|---|---|---|---|---|---|---|---|---|---|---|---|---|
| mask | 0 | 0 | 0 | 1 | 1 | 1 | 0 | 0 | 0 | 1 | 1 | 1 | 0 | 0 | 0 |
| | | | | 1 | 2 | 3 | | | | i | j | k | | | |

← 1024 bits (128 bytes) →

TECHNIQUES TO ENCODE AND DECODE FOR CHARACTER CLASS MATCHING

CROSS-REFERENCE TO RELATED APPLICATIONS

This application claims the benefit of priority to Patent Cooperation Treaty (PCT) Application No. PCT/CN2021/132978 filed Nov. 25, 2021. The entire content of that application is incorporated by reference.

BACKGROUND

Literal matching is widely used in scenarios such as network I/O (Input/Output), network intelligence, intrusion detection and prevention (IDS/IPS), deep packet inspection (DPI), web application firewall (WAF), etc. An example of a type of system for literal matching, also referred to as regular expression (regex) matching, is known as Hyperscan. Hyperscan is a high-performance regex matching library, and its use of multi-literal matching algorithms is described in detail in a whitepaper authored by Wang, Xiang, et al. "Hyperscan: a fast multi-pattern regex matcher for modern CPUs." 16th {USENIX} Symposium on Networked Systems Design and Implementation (NSDI '19), February 2019.

A character class indicates a set of American Standard Code for Information Interchange (ASCII) characters. A character class is an important syntax in regex matching. For example, a given expression, /^SEARCH\s+[a-z][^\n]/, the structures or characters surrounded by brackets [a-z] and [^/n] are called a character class, each representing a set of specific characters. A character class of [a-z] means that characters a to z are included in this character class. A character class of [^\n] means all characters except newline characters are included in this character class.

Character class matching for a byte stream of input data aims to detect an appearance of any character belonging to a targeted or defined character class via scanning the input data. A common usage of character class in regex matching is that as long as any character in a character class is detected, it can be said that the character class is also detected. For example, a scenario where input data does not contain any lowercase alphabetic characters (a-z), then the above expression that includes [a-z] will have no character matches. Thus it is possible to use character class matching as a filter to accelerate regex matching.

BRIEF DESCRIPTION OF THE DRAWINGS

FIG. 8 illustrates an example fast model (F-Model) encoding scheme.

DETAILED DESCRIPTION

Regex matching solutions used in types of systems such as Hyperscan, Perl Compatible Regular Expressions (PCRE), Regular Expression 2 (RE2), etc., are typically derived from finite automata theory. These regex matching solutions are basically implemented on non-deterministic finite automaton (NFA) and deterministic finite automaton (DFA). Character class matching is implemented within the procedures of these regex matching solutions, by comparing every target character in a character class for every input byte of input data. Comparing every target character in the character class is not scalable as it requires multiple times of comparison to check each byte to determine if a character match is found. Also, performance for this type of byte by byte comparing/checking is highly sensitive to the number of characters included in the character class. Various encoding and decoding schemes or methodologies for ASCII characters included in a character class are described in detail below. Processor executed single instruction multiple data (SIMD) instructions may also be utilized in regex matching to accelerate table lookup operations associated with detecting or not detecting at least one character included in an encoded character class.

Figure 1:
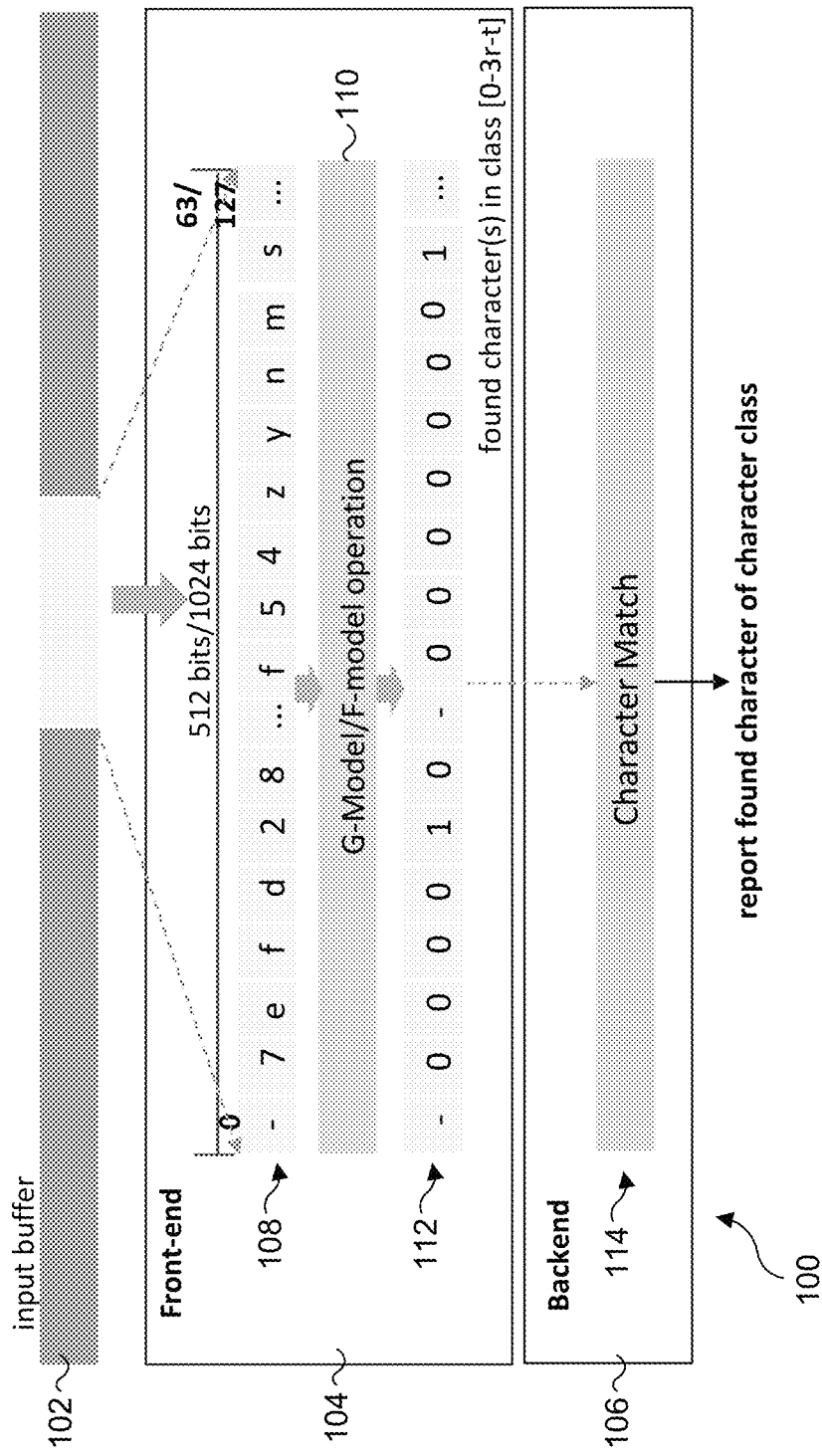
FIG. 1 illustrates an example diagram for a high-level workflow.

FIG. 1 illustrates an example diagram 100 for a high-level workflow implementing a G-Model/F-Model operation 110. The high-level workflow consists of two parts: a front-end 104 and a back-end 106. The front-end 104 uses SIMD instructions to process either 512 bits or 1024 bits of input data 108 to perform a mask lookup to decode encoded mask tables for regex matching for at least one character included in a character class. Back-end 106 confirms the final result: character match or no character match. In some examples, as shown in FIG. 1, diagram 100 also includes an input buffer 102.

According to some examples, all of or at least a portion of input data 108 may be referred to as a 'source vector' and is sampled from input buffer 102. For example, in a common implementation, input buffer 102 represents a sliding window (e.g., an input sample) of a byte stream (e.g., packetized data) that is being processed for regex matches for at least one character included in a character class. A chunk of data included in the sliding window, in some examples, may be a character string that may include 512 or 1024 bits. In some examples, for G-Model operation, 512 bits input data 108 may serve as a 512-bit source vector to perform a mask lookup to decode an encoded mask table using SIMD instructions to determine, in a parallel manner, whether at least one character match is detected in input data 108. In other examples, for F-Model operation, 1024 bits input data 108 may serve as a pair of 512-bit source vectors to perform a mask lookup to decode an encoded mask table using at least one SIMD instruction to determine, in a parallel manner, whether at least one character match is detected in input data 108. Both examples for G-Model or F-Model operations using 512 or 1024 bits as source vectors are described in more detail below.

SIMD instructions used for either G-Model or F-Model operations to perform a mask lookup to decode encoded mask tables may be executed by a processor including one or more cores. The processor, for example, may be an Intel®, an AMD®, an ARM® or a RISC-V processor. For example, some Intel® processors such as, but not limited to, Xeon® processors or some AMD® processors such as, but not limited to Zen® processors may be capable of executing the SIMD instructions. In some examples, the SIMD instructions executed by either the Intel® or AMD® processors may include, but are not limited to, 512-bit advanced vector extension (AVX-512) SIMD instructions. In some examples, as described more below, various AVX-512 SIMD instructions may be used for either G-Model or F-Model operations to perform a mask lookup to decode encoded mask tables for regex matching for at least one character included in a character class.

According to some examples, a targeted character class may be [0-3r-t]. For these examples, a 512-bit/1024-bit result 112 may be generated by G-Model/F-Model operation 110. As described more below, a non-zero value generated by either a G-Model or F-Model operation indicates that at least one character included in the targeted character class has been found in input data. As shown in FIG. 1, 512-bit/1024-bit result 112 has a non-zero value because G-Model/F-Model operation 110 was able to detect characters "2" and "s" in input data 108. Both these characters are included in targeted character class [0-3r-t]. The 512-bit/1024-bit result 112 having a non-zero value is provided as an input to match confirmation logic 114 in back-end 106. As shown in FIG. 1, a character match is confirmed by match confirmation logic 114 recognizing the non-zero result and then, in some examples, match confirmation logic 114 reports that at least character was found.

Figure 2:
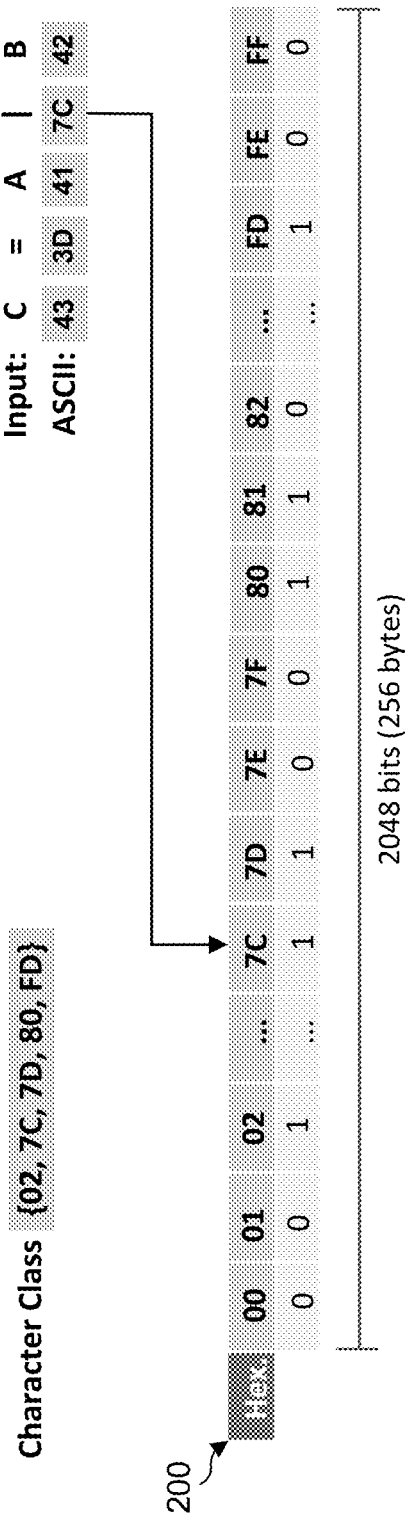
FIG. 2 illustrates an example first table for encoding characters of a character class.

FIG. 2 illustrates an example table 200 for encoding characters of a character class. According to some examples, table 200 may represent a masking table of 1 row by 256 columns to provide an encoding of a character class that includes characters from among the 256 characters included in the American Standard Code for Information Interchange (ASCII) extended table. The ASCII extended table of 256 characters includes control characters, symbol and sign characters. Each ASCII character is encoded with 8 bits. The first 128 characters are also known as standard ASCII characters and these first 128 characters cover the most commonly seen printable and non-printable characters. In some examples, these first 128 characters may be encoded with 7 bits instead of the 8 bits used for all 256 characters included in the ASCII extended table.

According to some examples, a goal of character class matching is to tell whether input data contains any character belonging to a given character class. As shown in FIG. 2, a target character class may include characters corresponding to ASCII characters located at hexadecimal values 02, 7C, 7D, 80, FD. For these examples, in an encoding state, table 200 may be created such that each of the 256 ASCII hexadecimal values are mapped to a 0/1 value. An encoded value of 1 in a cell below a given hexadecimal value means the character for that hexadecimal value belongs to the target character class, while an encoded value of 0 means the opposite. In a decoding state, for every input value representing a character, a corresponding ASCII hexadecimal value is used as an index to lookup if the character has been encoded as a 1 or 0. An encoded value of 1 means the input value representing the character belongs to the target character class. For example, as shown in FIG. 1, an input value of 7C representing the ASCII character '|' is determined as being a part of the character class when a lookup of table 200 at 7C indicates a value of 1.

Rather than performing a byte by byte table lookup of each input character as mentioned above for table 200, a parallel lookup of a multi-byte stream (e.g., 64-bytes) of input data may be possible by leveraging one or more SIMD instructions. In examples described more below, use of the SIMD instructions may enable each byte representing a character in the multi-byte stream to be checked, in a parallel manner, to generate a non-zero or zero vector that indicates whether at least one character included in a target character class was detected or found in the checked characters of the multi-byte stream.

Figure 3:
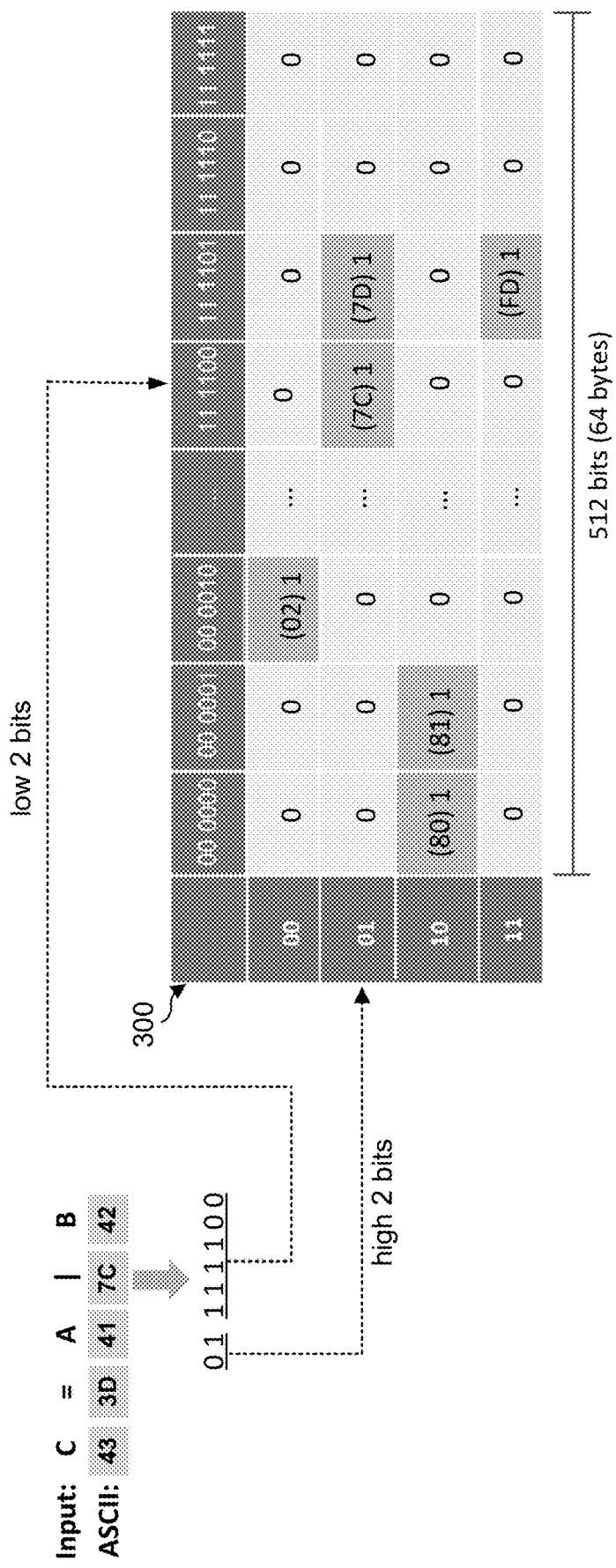
FIG. 3 illustrates an example second table for encoding characters of a character class.

FIG. 3 illustrates an example table 300 for encoding characters of a character class. According to some examples, table 300 may represent a masking table of 4 rows and 64 columns to provide an encoding of the same character class that includes ASCII characters located at hexadecimal values 02, 7C, 7D, 80, FD that was encoded in table 200 shown in FIG. 2. For these examples, the highest 2 bits for each character included in the character class are considered independently from the lowest 6 bits to arrive at a model for table 300 of 4 rows and 64 columns to encode the character class. This model for table 300 of 4 rows and 64 columns contributes to the core of the G-Model mentioned above for the description of FIG. 1.

FIG. 3 also shows how an example lookup for ASCII character '|' (0x7C) included an input to see if that character is included in the target character class. According to the ASCII extended character table, character '|' has an 8-bit binary value of 01 111100. For this binary value of 01 111100 a row ID of "01" is derived from the high 2 bits and a column ID of "111100" is derived from the low 6 bits. As shown in FIG. 3, a value of 1 is included in the cell of table 300 that corresponds to the row ID of '01' and column ID of "111100" to arrive at an answer, based on this single byte lookup, that the ASCII character '|' has a match to the targeted character class. A byte by byte operation to determine whether a character match exists is less than optimal. As described more below, an encoding/decoding methodology or scheme used for the G-Model is disclosed that expands on use of a 4 row and 64 column table to allow for byte parallelism for implementing a G-Model operation to check an encoded mask table to identify whether input data includes at least one ASCII character that matches an ASCII character included in a targeted character class.

Figure 4:
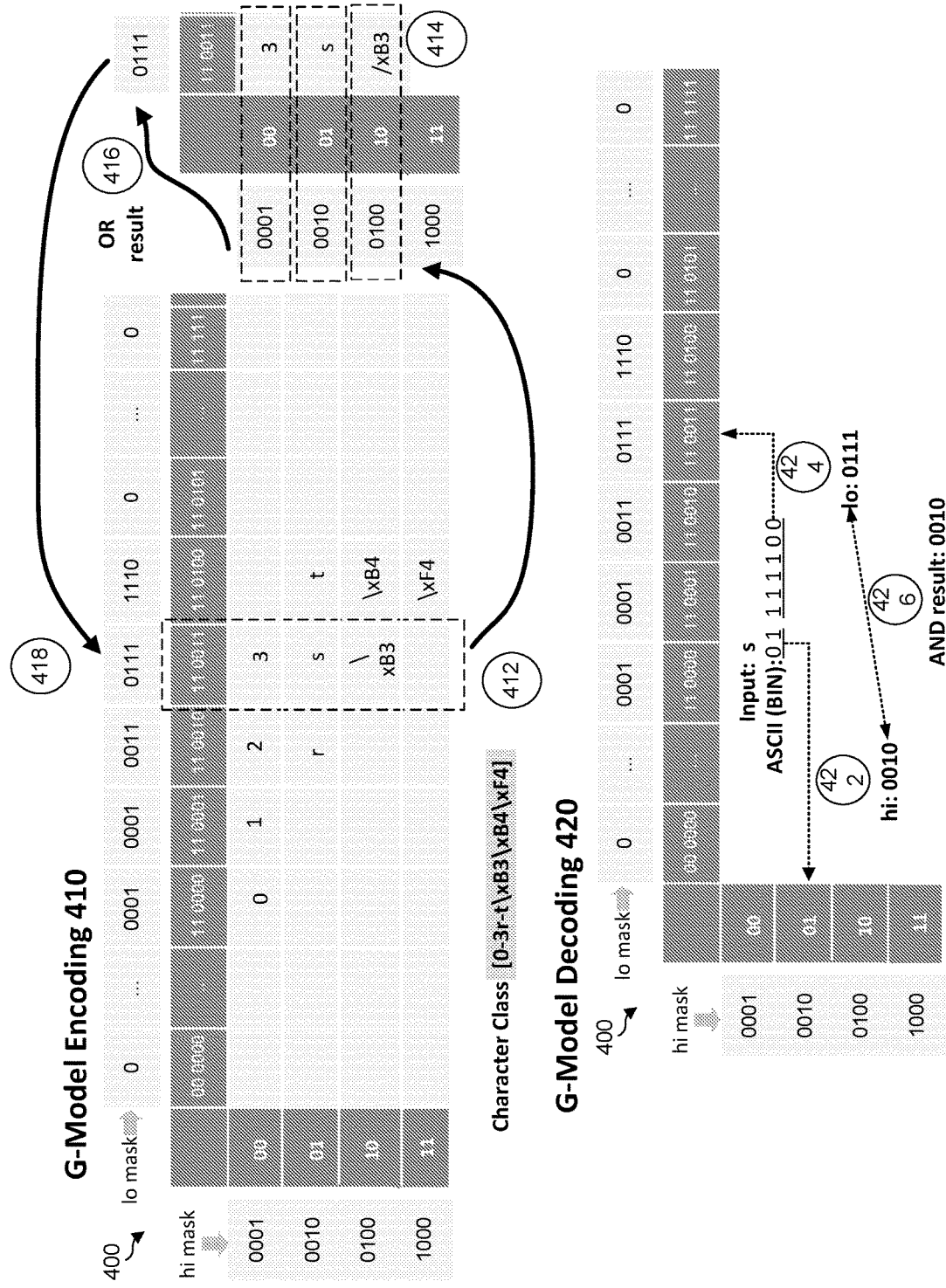
FIG. 4 illustrates example general model (G-Model) encoding and decoding schemes.

FIG. 4 illustrates example G-Model encoding 410 and G-Model decoding 420 schemes. According to some examples, a character class [0-3r-t\xB3\xB4\xF4\] includes ASCII character 0-3r-t and also includes ASCII characters having hexadecimal values of xB3(³), xB4(') and xF4(ô). Table 400 shows locations of these characters in a 4 row and 64 column table based on each character's 8-bit ASCII value and using the methodology mentioned above for table 300 that considers the highest 2 bits independently from the lowest 6 bits.

G-Model encoding 410 creates 2 byte vectors for each dimension of table 400. One called hi mask that corresponds to the 4 rows and another called lo mask that corresponds to the 64 columns. As shown in FIG. 4, the left side of table 400 has 4-bit hi mask values for each of the 4 rows that has one bit position set as 1, with other bit positions set as 0. The four hi mask values have different bit positions set to 1. For the G-Model, these hi mask values are predefined. However, lo mask values are calculated.

In some examples, column 11 0011 is identified at 412 for providing an example of how a lo mask value for that column containing '3', 's', and '\xB3' is calculated for G-Model encoding 410. Then at 414, rows of that column which contain '3', 's', and '\xB3' are identified as 00, 01 and 10. At 416, the hi mask values for rows 00, 01 and 10 of 0001, 0010 and 0100 are logically OR together to calculate an OR result at 416 that generates a lo mask value of 0111. The calculated lo mask value of 0111 for column 11 0011 completes the encoding of '3', 's', and '\xB3' in table 400. The same operations for calculating the lo mask value for column 11 0011 are also performed to calculate lo mask values of 0001, 0001, 0011 and 1110 for respective columns 11 0000, 11 0001, 11 0010 and 11 0100 to complete the encodings of the other characters included in the character class. Also, lo mask values for columns not including characters from the character class will have a value of 0.

According to some examples, with lo mask and hi mask values for an encoded character class, character class matching may utilize G-Model decoding 420. For these examples, the character being checked for a match is 's'. According to G-Model decoding 420, at 422, the high 2 bits for the 's' character's ASCII 8-bit binary value is used to lookup row 01's hi mask value of 0010. Then at 424, the low 6 bits are used to lookup column 11 0011's lo mask value of 0111. At 426, the hi and lo mask values are logically AND together to generate a non-zero result of 0010. The non-zero result indicates that 's' belongs to the target character class. If a zero result had occurred, 's' would not have been part of the target character class. The correctness of G-Model decoding 420 is guaranteed by G-model encoding 410. For example, for a given column, since a calculated lo mask value collects all the bit positions set to 1 from hi mask values, as long as a matching character belongs to a character class, the decoding result will surely be non-zero because the 2 mask values share the same positions set to 1. On the contrary, if a character does not belong to the character class, its decoding result will be zero.

Figure 5:
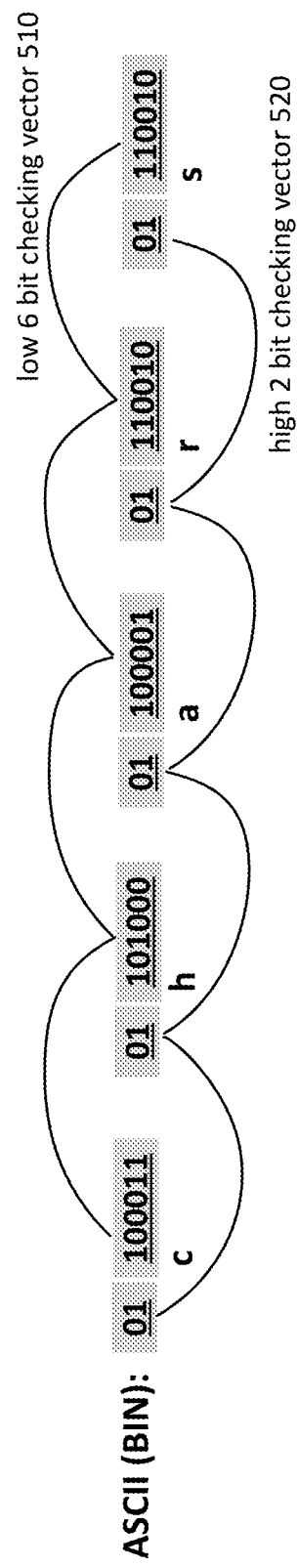
FIG. 5 illustrates an example lookup scheme for the G-Model.

FIG. 5 illustrates an example lookup scheme 500 for the G-Model. According to some examples, as shown in FIG. 5, lookup scheme 500 may be part of a G-Model encoding/decoding method that splits each ASCII character from 2 dimensions, meanwhile it splits the information of character matching/existence into a low 6 bit checking vector 510 and a high 2 bit checking vector 520. Independent low 6 bit checking vector 510 and high 2 bit checking vector 520 make it possible to transfer a character class matching problem into 2 new sub-problems. Each sub-problem, for example, may use a SIMD instruction to check multiple characters included in input data for matches in a parallel manner.

Figure 6:
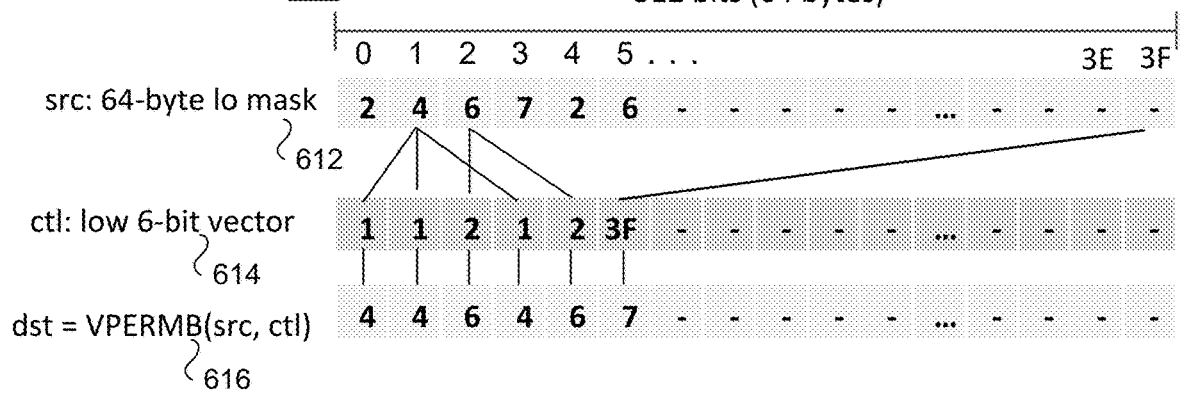
FIG. 6 illustrates an example G-Model decoding scheme using SIMD instructions.
Figure 6:
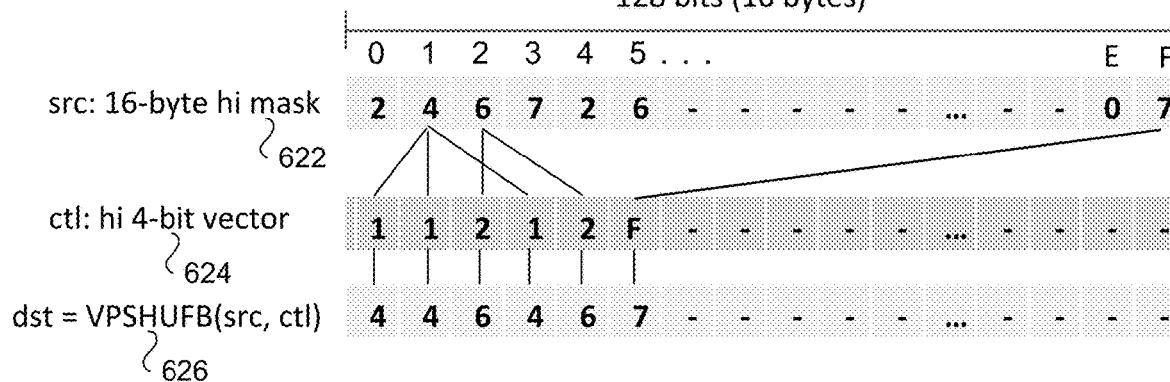

FIG. 6 illustrates an example G-Model decoding scheme 600 using SIMD instructions. According to some examples, as shown in FIG. 6, G-Model decoding scheme 600 may include execution of G-Model decoding pseudocode 605 that includes use of a first SIMD instruction VPERMB (Permute Packed Bytes Elements) for a lo mask source vector and use of a second SIMD instruction VPSHUFB (Packed Shuffle Bytes) for a hi mask source vector.

According to some examples, as shown in FIG. 6 for VPERMB shuffle 610, a source (src) operand is represented by src: 64-byte lo mask 612 and a ctl (control) operand is represented by ctl: low 6-bit vector 614, and a dst (destination)=VPERMB(src,ctl) 616 represents an output resulting from use of the VPERMB instruction to enable a low 6 bit checking result for 64 bytes of input data simultaneously. For these examples, each byte in the ctl: low 6-bit vector 614 identifies the lowest 6 bits of the byte-offset from the beginning of the src: 64-byte lo mask vector 612, as shown in the byte-offset values 0, 1, 2, 3, 4, 5, . . . 3F above src: 64-byte lo mask vector 612. For example, the source vector value for src: 64-byte lo mask 612 in the '1' byte offset position is '4'. Thus, for every instance of '1' in ctl: 64-byte low 6-bit 614, the output for dst: VPERMB(src,ctl) 616 is a 4. Similarly, for every instance of '2' in src: 64-byte lo mask 612, the output for dst=VPERMB(src,ctl) 616 is 6.

In some examples, for checking the high 2 bits, a similar byte shuffling SIMD instruction of VPSHUFB may be used to enable a high 2 bit checking result for 64 bytes of input data simultaneously. VPSHUFB works like VPERMB as shown in FIG. 6 for VPSHUFB shuffle 620 but only needs a 16-byte (128 bit) indexing space for high 2 bits indexing. VPSHUFB only needs a 16-byte indexing space because for 64 bytes of input data, only the high 2 bits of each 8-bit character are being checked for a character match. In other words, only $\frac{1}{4}^{th}$ of the bits need to be indexed and $\frac{1}{4}^{th}$ of 64 bytes equates to 16 bytes.

According to some examples, as shown in FIG. 6 for VPSHUFB shuffle 620, a src operand is represented by a src: 16-byte hi mask 622 and a ctl operand is represented by ctl: 4-bit vector 624, and a dst=VPSHUFB(src,ctl) 626 represents an output resulting from execution of the VPSHUFB instruction to enable a high 2 bit checking result for the 64 bytes of input data (having 16 bytes for the high 2 bits) simultaneously. For these examples, each byte in the ctl: hi 4-bit vector 624 identifies the lowest 6 bits of the byte-offset from the beginning of the src: 16-byte hi mask 622, as shown in the byte-offset values 0, 1, 2, 3, 4, 5, . . . F above src: 16-byte hi mask 622. For example, the source vector value for src: 16-byte hi mask 622 in the '1' byte offset position is '4'. Thus, for every instance of '1' in ctl: hi 4-bit vector 624, the output for dst VPSHUFB 626 is a 4. Similarly, for every instance of '2' in src: 16-byte hi mask 622, the output for dst: VPHUFB(src,ctl) 626 is 6.

According to some examples, as shown in G-Model decoding pseudocode 605, after obtaining result vectors dst=VPERMB(src, ctl) 616 and dst=VPSHUFB(src,ctl) 626, a logical AND of these two dst vectors generates a result vector. For these examples, based on the result vector generated by execution of G-Model decoding pseudocode 605 a determination can be made as to whether the 64 bytes of input data contains any characters belonging to a target character class according to whether the result vector is non-zero or not. In other words, a non-zero result vector indicates that at least one character in the 64 input bytes is a match for a character included in the target character class.

Figure 7:
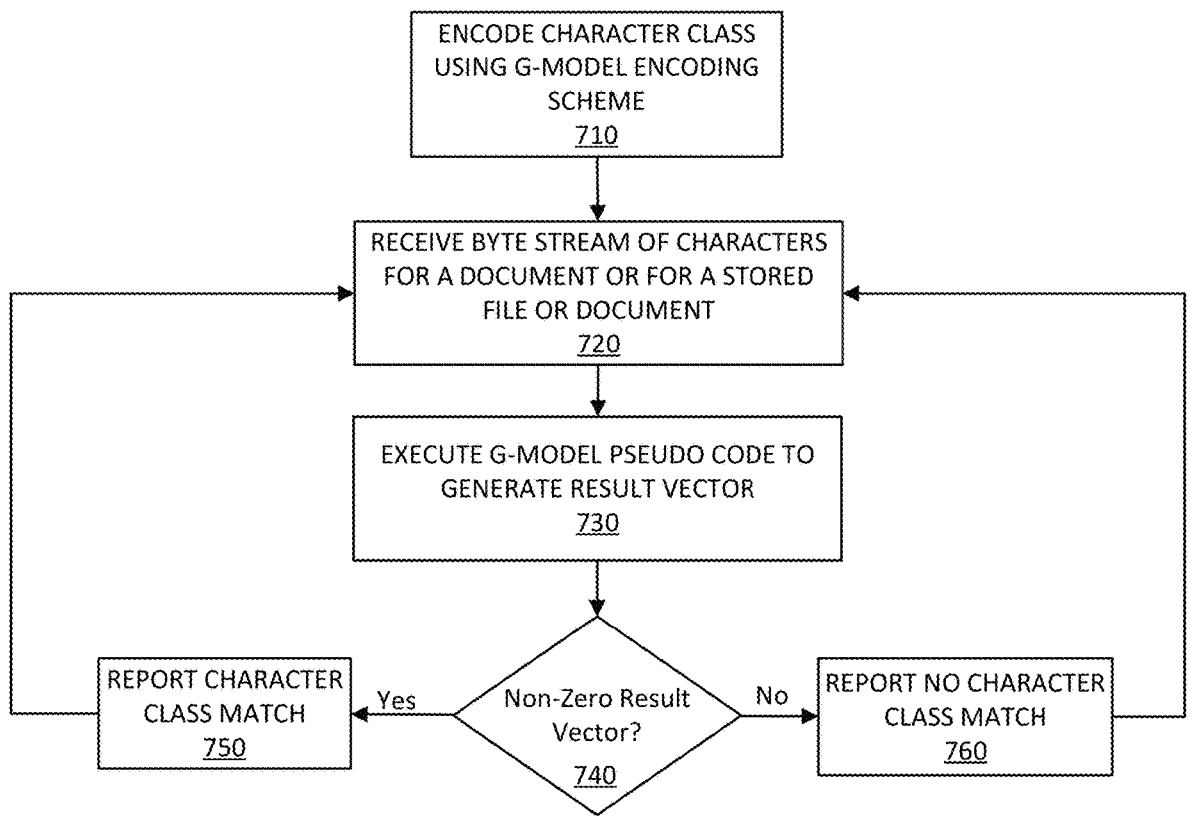
FIG. 7 illustrates an example logic flow for implementing the G-Model.

FIG. 7 illustrates an example logic flow 700 for implementing G-Model operations described in FIGS. 4 and 6 for encoding a character class and decoding the encoded character class to determine whether at least one character in a received byte stream matches a character included in the character class. As shown in a block 710, a character class is encoded using a G-Model encoding scheme. For example, G-Model encoding 410 as described above for FIG. 4 that includes the use of a 4 row and 64 column mask table that uses predefined hi mask values and calculated lo mask values to encode the character class to generate an encoded mask table.

According to some examples, as shown in block 720, a byte stream of characters (e.g., included in packetized data) is received for a document or for a stored file or document. The received byte stream may be a chunk of data that includes a character string. Then, as shown in block 730, a G-model pseudo code is executed to generate a result vector. For these examples, decoding G-model pseudocode 605 may be executed based on 64 bytes of input data included in the received byte stream to check, in a parallel manner, each character of the input data with the encoded mask table to see if the input data includes at least one character that matches a character included in the character class encoded at block 710.

In some examples, as shown in decision block 740, a determination is made as to whether the result vector generated by the G-Model pseudocode is a non-zero result vector. If the result vector is a non-zero result vector, logic flow 700 moves to block 750 and a character class match is reported. If the result vector is not a non-zero result vector, logic flow 700 moves to block 760 and a non-character class match is reported. Logic flow 700 loops back to block 720 from block 750 or block 760 to receive another byte stream of input data, e.g., another 64-bytes.

FIG. 8 illustrates an example F-Model encoding scheme 800. According to some examples, table 805 represents a masking table of a single row and 128 columns. Table 805 includes 128 columns to represent just the first 128 ASCII characters (0-127) from the ASCII extended character table (hexadecimal values 0x00 to 0x7F). According to an evaluation of real-world rulesets for character class regex matching, these 128 ASCII characters cover about 86% of character classes for real-work rulesets. For these examples, unlike the G-Model, no special encoding is needed for F-Model encoding scheme 800 such as encoding using hi mask and lo mask values as described above for G-Model encoding 410. In some examples, as shown in FIG. 8, a character class of [1-3i-k] may be encoded to result in a 128-byte mask vector.

Figure 9:
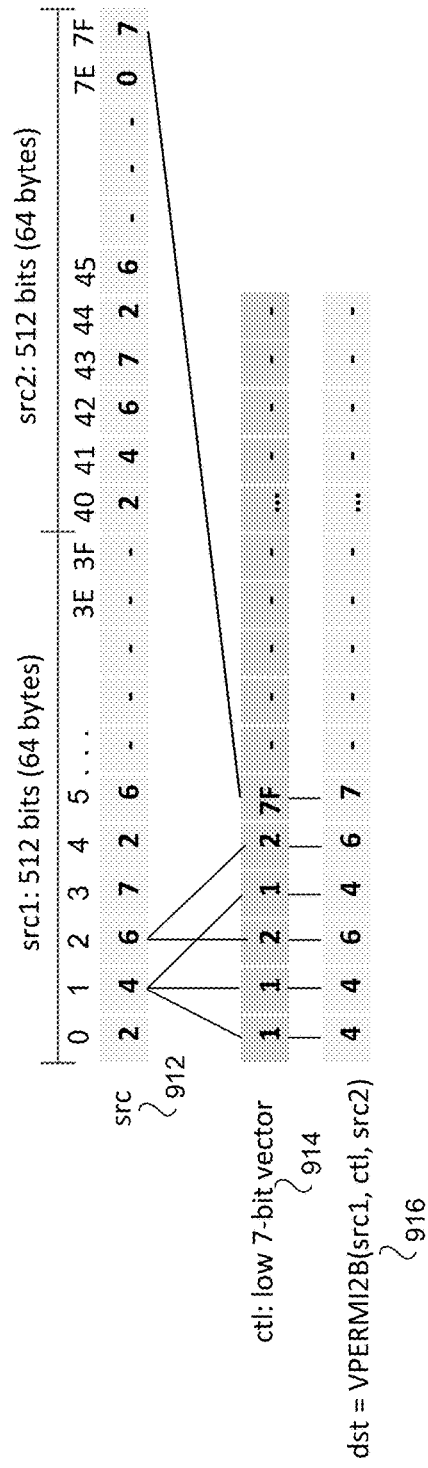
FIG. 9 illustrates an example F-Model decoding scheme.

FIG. 9 illustrates an example F-Model decoding scheme 900 using SIMD instructions. According to some examples, as shown in FIG. 9, F-Model decoding scheme 900 may include execution of F-Model decoding pseudocode 905 that includes use of SIMD instruction VPERMI2B (Full Permute of Bytes from Two Tables). VPERMI2B works similar to VPERMB mentioned above for G-Model decoding scheme 600 but can index a wider source (src) space of up to 128 bytes. This is achieved by combining two 64-byte chunks of input data together, and using the low 7 bits of each byte in a ctl mask as a src index.

In some examples, as shown in FIG. 9 for VPERMI2B shuffle 910, a src operand is represented by src1 and src2 included in src 912, each including 64 bytes. A ctl operand is represented by ctl: low 7-bit vector 914. A dst=VPERMI2B(src1,ctl,src2) 916 represents an output resulting from use of the VPERMI2B to enable low 7 bit checking of results for 128 bytes of input data simultaneously and/or in a parallel manner. For these examples, each byte in the 128-byte ctl: low 7 bit vector 914 identifies the lowest 7 bits of the byte-offset from the beginning of the src 912, as shown in the byte-offset values 0, 1, 2, 3, 4, 5, . . . 7F above src 912. For example, the source vector value for src 912 in the '1' byte offset position is '4'. Thus, for every instance of '1' in ctl: low 7 bit vector 914, the output for dst=VPERMI2B(src1,ctl,src2) 616 is a 4. Similarly, for every instance of '2' in src 912, the output for dst=VPERMI2B(src1,ctl,src2) 916 is 6.

According to some examples, as shown in F-Model decoding pseudocode 905, after using the SIMD VPERMI2B instruction to obtain result vector dst=VPERMI2B(src1,ctl,src2) 916, a result vector is generated. For these examples, based on the result vector generated by execution of F-Model decoding pseudocode 905 a determination can be made as to whether the 128 bytes of input data contain any characters belonging to a target character class according to whether the result vector is non-zero or not. In other words, a non-zero result vector indicates that at least one character in the 128 bytes of input data is a match for a character included in the target character class having characters that are included in the first 128 ASCII characters.

Figure 10:
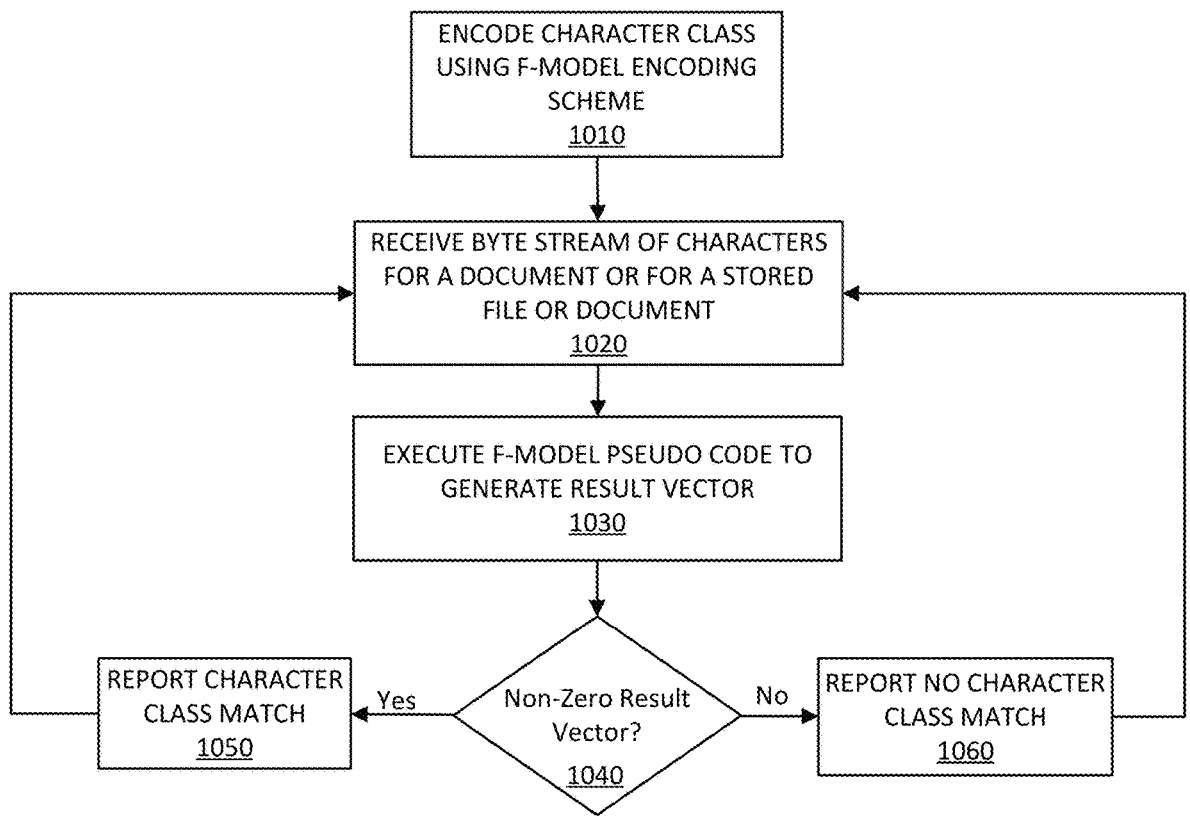
FIG. 10 illustrates an example logic flow for implementing the F-Model.

FIG. 10 illustrates an example logic flow 1000 for implementing F-Model operations described in FIGS. 8 and 9 for encoding a character class and decoding the encoded character class to determine whether at least one character in a received byte stream matches a character included in the character class. As shown in a block 1010, a character class is encoded using an F-Model encoding scheme. For example, F-Model encoding scheme 800 as described above for FIG. 8 that includes the use of a 1 row and 128 column table that covers the first 128 ASCII characters of the ASCII extended table to encode the character class.

According to some examples, as shown in block 1020, a byte stream of characters (e.g., included in packetized data) is received for a document or for a stored file or document. The received byte stream may be a chunk of data that includes a character string. Then, as shown in block 1030 an F-model pseudocode is executed to generate a result vector. For these examples, F-model pseudocode 905 may be executed based on 128 bytes of input data included in the received byte stream to check, in a parallel manner, each character of the input data with the encoded mask table to see if the input data includes at least one character that matches a character included in the character class encoded at block 1010.

In some examples, as shown in decision block 1040, a determination is made as to whether the result vector generated by the F-Model pseudocode is a non-zero result vector. If the result vector is a non-zero result vector, logic flow 1000 moves to block 1050 and a character class match is reported. If the result vector is not a non-zero result vector, logic flow 1000 moves to block 1060 and a non-character class match is reported. Logic flow 1000 loops back to block 1020 from block 1050 or block 1060 to receive another byte stream of input data, e.g., another 128-bytes.

G-Model or F-Model operations to decode encoded character classes to determine if input data includes a character that matches a character included in a character class may be used in a wide variety of use cases where an objective is to quickly filter input data that includes characters of a character class. The following list of use cases is exemplary and non-limiting. Search Engines and Content Search of large Corpus and Databases, Spam Filters, Intrusion Detection System, Plagiarism Detection, Bioinformatics and DNA Sequencing, Digital Forensics, Information Retrieval Systems etc. Various Packet Processing operating on Packet Payload content, including Deep Packet Inspection, Packet Filtering, Packet Switching. Uses in Virtualized Environments such as Application Routing, VM or Container Selection, and Microservices Selection. Pattern Searching of Encrypted Content including Encrypted Memory and Network Data Encryption uses.

The logic flows shown in FIG. 7 or 10 may be representative of example methodologies for performing novel aspects described in this disclosure. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 11:
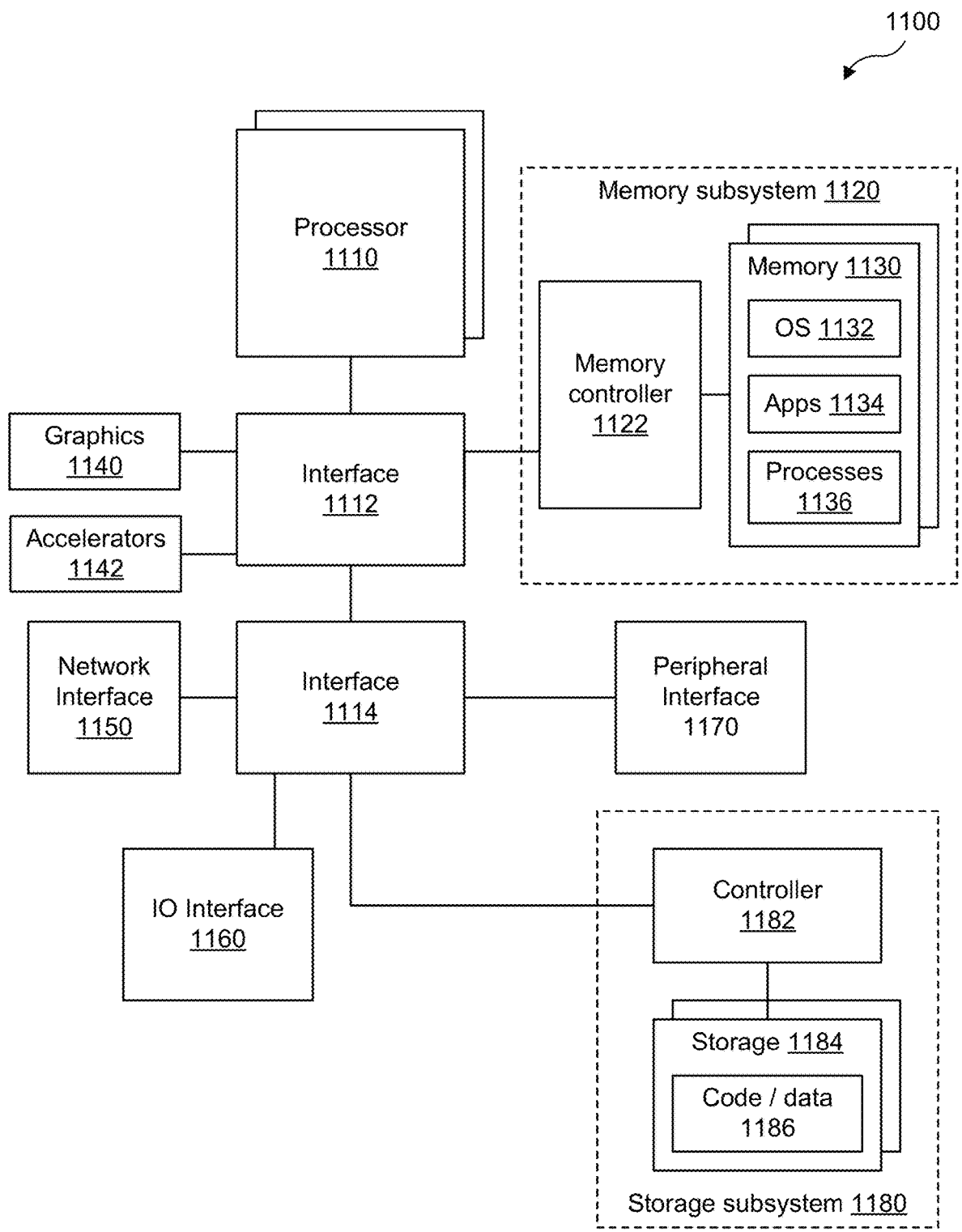
FIG. 11 illustrates an example diagram of a computing system.

FIG. 11 illustrates an example diagram of a computing system 1100. In some examples, computing system 1100 may be a server or similar computing system in which aspects of the embodiments disclosed above may be implemented. Computing system 1100 includes one or more processors 1110, which provides processing, operation management, and execution of instructions for computing system 1100. Processor 1110 can include any type of microprocessor, central processing unit (CPU), graphics processing unit (GPU), processing core, multi-core processor or other processing hardware to provide processing for computing system 1100, or a combination of processors. Processor 1110 controls the overall operation of computing system 1100, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

According to some examples, processor 1110 may be an infrastructure processing unit (IPU) or data processing unit (DPU) or may be utilized by an IPU or DPU. An xPU may refer at least to an IPU, DPU, graphic processing unit (GPU), general-purpose GPU (GPGPU). An IPU or DPU may include a network interface with one or more programmable (e.g., network programming language (NPL)) or fixed function processors to perform offload of operations that could have been performed by a CPU. An IPU or DPU may be configured as a network switch with one or more programmable or fixed function processors to perform offload of operations that could have been performed by a CPU (e.g., a smart switch). The IPU or DPU can include one or more memory devices (not shown). In some examples, the IPU or DPU can perform virtual switch operations, manage storage transactions (e.g., compression, cryptography, virtualization), and manage operations performed on other IPUs, DPUs, servers, or devices.

In one example, computing system 1100 includes interface 1112 coupled to processor 1110, which can represent a higher speed interface or a high throughput interface for system components that needs higher bandwidth connections, such as memory subsystem 1120 or optional graphics interface components 1140, or optional accelerators 1142. Interface 1112 represents an interface circuit, which can be a standalone component or integrated onto a processor die. Where present, graphics interface 1140 interfaces to graphics components for providing a visual display to a user of computing system 1100. In one example, graphics interface 1140 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1140 generates a display based on data stored in memory 1130 or based on operations executed by processor 1110 or both. In one example, graphics interface 1140 generates a display based on data stored in memory 1130 or based on operations executed by processor 1110 or both.

According to some examples, accelerators 1142 can be a fixed function offload engine that can be accessed or used by a processor 1110. For example, an accelerator among accelerators 1142 can provide data compression capability, cryptography services such as public key encryption (PKE), cipher, hash/authentication capabilities, decryption, or other capabilities or services. In some examples, in addition or alternatively, an accelerator among accelerators 1142 provides field select controller capabilities as described herein. In some cases, accelerators 1142 can be integrated into a CPU socket (e.g., a connector to a motherboard or circuit board that includes a CPU and provides an electrical interface with the CPU). For example, accelerators 1142 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1142 can provide multiple neural networks, CPUs, processor cores, general purpose graphics processing units, or graphics processing units can be made available for use by AI or ML models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1120 represents the main memory of computing system 1100 and provides storage for code to be executed by processor 1110, or data values to be used in executing a routine. Memory subsystem 1120 can include one or more memory devices 1130 such as read-only memory (ROM), flash memory, one or more varieties of random access memory (RAM) such as DRAM, or other memory devices, or a combination of such devices. Memory 1130 stores and hosts, among other things, operating system (OS) 1132 to provide a software platform for execution of instructions in computing system 1100. Additionally, applications 1134 can execute on the software platform of OS 1132 from memory 1130. Applications 1134 represent programs that have their own operational logic to perform execution of one or more functions. Processes 1136 represent agents or routines that provide auxiliary functions to OS 1132 or one or more applications 1134 or a combination. OS 1132, applications 1134, and processes 1136 provide software logic to provide functions for computing system 1100. In one example, memory subsystem 1120 includes memory controller 1122, which is a memory controller to generate and issue commands to memory 1130. It will be understood that memory controller 1122 could be a physical part of processor 1110 or a physical part of interface 1112. For example, memory controller 1122 can be an integrated memory controller, integrated onto a circuit with processor 1110.

While not specifically illustrated, it will be understood that computing system 1100 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, computing system 1100 includes interface 1114, which can be coupled to interface 1112. In one example, interface 1114 represents an interface circuit, which can include standalone components and integrated circuitry. In one example, multiple user interface components or peripheral components, or both, couple to interface 1114. Network interface 1150 provides computing system 1100 the ability to communicate with remote devices (e.g., servers or other computing devices) over one or more networks. Network interface 1150 can include an Ethernet adapter, wireless interconnection components, cellular network interconnection components, USB (universal serial bus), or other wired or wireless standards-based or proprietary interfaces. Network interface 1150 can transmit data to a device that is in the same data center or rack or a remote device, which can include sending data stored in memory. Network interface 1150 can receive data from a remote device, which can include storing received data into memory. Various embodiments can be used in connection with network interface 1150, processor 1110, and memory subsystem 1120.

In one example, computing system 1100 includes one or more IO interface(s) 1160. IO interface 1160 can include one or more interface components through which a user interacts with computing system 1100 (e.g., audio, alphanumeric, tactile/touch, or other interfacing). Peripheral interface 1170 can include any hardware interface not specifically mentioned above. Peripherals refer generally to devices that connect dependently to computing system 1100. A dependent connection is one where computing system 1100 provides the software platform or hardware platform or both on which operation executes, and with which a user interacts.

In one example, computing system 1100 includes storage subsystem 1180 to store data in a nonvolatile manner. In one example, in certain system implementations, at least certain components of storage 1180 can overlap with components of memory subsystem 1120. Storage subsystem 1180 includes storage device(s) 1184, which can be or include any conventional medium for storing large amounts of data in a nonvolatile manner, such as one or more magnetic, solid state, or optical based disks, or a combination. Storage 1184 holds code or instructions and data 1186 in a persistent state (i.e., the value is retained despite interruption of power to computing system 1100). Storage 1184 can be generically considered to be a "memory," although memory 1130 is typically the executing or operating memory to provide instructions to processor 1110. Whereas storage 1184 is nonvolatile, memory 1130 can include volatile memory (i.e., the value or state of the data is indeterminate if power is interrupted to computing system 1100). In one example, storage subsystem 1180 includes controller 1182 to interface with storage 1184. In one example controller 1182 is a physical part of interface 1114 or processor 1110 or can include circuits or logic in both processor 1110 and interface 1114.

In an example, computing system 1100 can be implemented using interconnected compute sleds of processors, memories, storages, network interfaces, and other components. High speed interconnects can be used such as: Ethernet (IEEE 802.3), remote direct memory access (RDMA), InfiniB and, Internet Wide Area RDMA Protocol (iWARP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

It should be appreciated that the exemplary computing platform 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Although not depicted, any system can include and use a power supply such as but not limited to a battery, AC-DC converter at least to receive alternating current and supply direct current, renewable energy source (e.g., solar power or motion based power), or the like.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The following examples pertain to additional examples of technologies disclosed herein.

Example 1. An example method may include sampling a chunk of data from a byte stream, the chunk of data may include a character string comprising n bytes. The method may also include identifying a character class that includes a plurality of characters. The method may also include performing a decoding operation using the character string as an input, the decoding operation to include checking, in a parallel manner, each character of the character string with an encoded mask table that includes encoded binary values for each character in the character class. The checking of each character may determine whether the character string includes at least one character in the character class.

Example 2. The method of example 1, the plurality of characters included in the character class may be selected from characters 0 to 127 of an ASCII extended character table. The encoded mask table may include 1 row and 128 columns to encode the plurality of characters included in the character class.

Example 3. The method of example 2, n may be 128 bytes, and the method is performed by executing a 512-bit SIMD instruction on a processor to perform the decode operation to check, in a parallel manner, each character of the character string with the encoded mask table.

Example 4. The method of example 3, the 128 byte character string is a source operand for the SIMD instruction and ASCII 7-bit values for the 128 byte character string are a control operand for the SIMD instruction.

Example 5. The method of example 4, a 128 byte non-zero result of the decode operation may indicate that the character string includes at least one character in the character class.

Example 6. The method of example 1, the plurality of characters included in the character class may be selected from character 0 to 256 of an ASCII extended character table, the encoded mask table may include 4 rows and 128 columns. High 2 bits and low 6 bits of ASCII 8-bit values for each character in the character class may be used to encode each character in the encoded mask table.

Example 7. The method of example 6, n may be 64 bytes, and the method is performed by executing a first 512-bit SIMD instruction and a second 512-bit SIMD instruction on a processor to perform the decode operation to check, in a parallel manner, each character of the character string with the encoded mask table.

Example 8. The method of example 7, the first 512-bit SIMD instruction may use the 64 byte character string as a first source operand and the low 6 bits of the ASCII 8-bit values for each character included in the 64 byte character string as a first control operand. The second 512-bit SIMD instructions may use 16 bytes of the 64 bytes character string that correspond to the high 2 bits of the ASCII 8-bit values as a second source operand and 4 bits that correspond to each row of the encoded mask table as a second control operand.

Example 9. The method of example 8 may also include performing a logical AND of a first result from the first 512-bit SIMD instruction with a second result from the second 512-bit SIMD instruction to generate a 64 byte result for the decode operation. For this example, a 64 byte non-zero result indicates that the character string includes at least one character in the character class.

Example 10. An example at least one machine readable medium may include a plurality of instructions that in response to being executed by a system may cause the system to carry out a method according to any one of examples 1 to 9.

Example 11. An example apparatus may include means for performing the methods of any one of examples 1 to 9.

Example 12. An example non-transitory tangible machine-readable medium may have instructions stored thereon that include a software program or module for performing regular expression matching of a byte stream. Execution of the instructions on a processor of a computing system may enable the computing system to sample a chunk of data from the byte stream, the chunk of data comprising a character string comprising n bytes. The computing system may also be enabled to identify a character class that includes a plurality of characters. The computing system may also be enabled to perform a decoding operation using the character string as an input. The decoding operation may include checking, in a parallel manner, each character of the character string with an encoded mask table that includes encoded binary values for each character in the character class. The checking of each character may determine whether the character string includes at least one character in the character class.

Example 13. The non-transitory tangible machine-readable medium of example 12, the plurality of ASCII characters included in the character class may be selected from characters 0 to 127 of an ASCII extended character table.

For this example, the encoded mask table includes 1 row and 128 columns to encode the plurality of characters included in the character class.

Example 14. The non-transitory tangible machine-readable medium of example 13, n is 128 bytes, and the computing system is to execute a 512-bit SIMD instruction on a processor to perform the decode operation to check, in a parallel manner, each character of the character string with the encoded mask table.

Example 15. The non-transitory tangible machine-readable medium of example 14, the 128 byte character string may be a source operand for the SIMD instruction and ASCII 7-bit values for the 128 byte character string may be a control operand for the SIMD instruction.

Example 16. The non-transitory tangible machine-readable medium of example 15, a 128 byte non-zero result of the decode operation may indicate that the character string includes at least one character in the character class.

Example 17. The non-transitory tangible machine-readable medium of example 12, the plurality of characters included in the character class may be selected from character 0 to 256 of an ASCII extended character table. The encoded mask table may include 4 rows and 128 columns. For this example, high 2 bits and low 6 bits of ASCII 8-bit values for each character in the character class may be used to encode each character in the encoded mask table.

Example 18. The non-transitory tangible machine-readable medium of example 17, n is 64 bytes, and the computing system is to execute a first 512-bit SIMD instruction and execute a second 512-bit SIMD instruction on a processor to perform the decode operation to check, in a parallel manner, each character of the character string with the encoded mask table.

Example 19. The non-transitory tangible machine-readable medium of example 18, the first 512-bit SIMD instruction may use the 64 byte character string as a first source operand and the low 6 bits of the ASCII 8-bit values for each character included in the 64 byte character string as a first control operand. The second 512-bit SIMD instructions may use 16 bytes of the 64 bytes character string that correspond to the high 2 bits of the ASCII 8-bit values as a second source operand and 4 bits that correspond to each row of the encoded mask table as a second control operand.

Example 20. The non-transitory tangible machine-readable medium of example 19, the instructions to further cause the computing system to perform a logical AND of a first result from the first 512-bit SIMD instruction with a second result from the second 512-bit SIMD instruction to generate a 64 byte result for the decode operation. For this example, a 64 byte non-zero result indicates that the character string includes at least one character in the character class.

Example 21. An example computing system may include a processor, coupled to memory, having a plurality of cores on which instructions are executed. The computing system may also include instructions that include a software program or module for performing regular expression matching of a byte stream. Execution of the instructions on the processor of the computing system may enable the computing system to sample a chunk of data from the byte stream. The chunk of data may be a character string that includes n bytes. The computing system may also be enabled to identify a character class that includes a plurality of characters. The computing system may also be enabled to perform a decoding operation using the character string as an input, the decoding operation to include checking, in a parallel manner, each character of the character string with an encoded mask table that includes encoded binary values for each character in the character class. The checking of each character may determine whether the character string includes at least one character in the character class.

Example 22. The computing system of example 21, the plurality of characters included in the character class may be selected from characters 0 to 127 of an ASCII extended character table. For this example, the encoded mask table may include 1 row and 128 columns to encode the plurality of characters included in the character class.

Example 23. The computing system of example 22, n is 128 bytes, and the computing system is to execute a 512-bit SIMD instruction on a processor to perform the decode operation to check, in a parallel manner, each character of the character string with the encoded mask table.

Example 24. The computing system of example 23, the 128 byte character string may be a source operand for the SIMD instruction and ASCII 7-bit values for the 128 byte character string may be a control operand for the SIMD instruction.

Example 25. The computing system of example 24, a 128 byte non-zero result of the decode operation may indicate that the character string includes at least one character in the character class.

Example 26. The computing system of example 21, the plurality of characters included in the character class may be selected from character 0 to 256 of an ASCII extended character table. The encoded mask table may include 4 rows and 128 columns. For this example, high 2 bits and low 6 bits of ASCII 8-bit values for each character in the character class may be used to encode each character in the encoded mask table.

Example 27. The computing system of example 26, n is 64 bytes, and the computing system is to execute a first 512-bit SIMD instruction and execute a second 512-bit SIMD instruction on a processor to perform the decode operation to check, in a parallel manner, each character of the character string with the encoded mask table.

Example 28. The computing system of example 27, the first 512-bit SIMD instruction may use the 64 byte character string as a first source operand and the low 6 bits of the ASCII 8-bit values for each character included in the 64 byte character string as a first control operand. The second 512-bit SIMD instructions may use 16 bytes of the 64 bytes character string that correspond to the high 2 bits of the ASCII 8-bit values as a second source operand and 4 bits that correspond to each row of the encoded mask table as a second control operand.

Example 29. The computing system of example 28, execution of the instructions on the processor of the computing system may further enable the computing system to perform a logical AND of a first result from the first 512-bit SIMD instruction with a second result from the second 512-bit SIMD instruction to generate a 64 byte result for the decode operation. For this example, a 64 byte non-zero result indicates that the character string includes at least one character in the character class.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
sampling from a byte stream a first 64 byte chunk of data and a second 64 byte chunk of data, the first and second 64 byte chunks of data comprising a 128 byte character string;
identifying a character class that includes a plurality of characters being selected from characters 0 to 127 of an American Standard Code for Information Interchange (ASCII) extended character table; and
performing a decoding operation using the 128 byte character string as an input, the decoding operation to include using 7 of 8 bits of individual bytes included in the first and second 64 byte chunks of data to check, in a parallel manner, characters of the 128 byte character string included in the first and second 64 byte chunks of data with an encoded mask table that includes encoded binary values for individual characters in the character class, wherein the checking of the characters of the 128 bytes characters string is to determine whether the 128 byte character string includes at least one character in the character class.

2. The method of claim 1, wherein the encoded mask table includes 1 row and 128 columns to encode the plurality of characters included in the character class.

3. The method of claim 2, wherein method is performed by executing a 512-bit single input multiple data (SIMD) instruction on a processor to perform the decode operation to check, in a parallel manner, the characters of the 128 byte character string included in the first and second 64 byte chunks of data with the encoded mask table.

4. The method of claim 3, wherein the 128 byte character string included in the first and second 64 byte chunks of data is a source operand for the SIMD instruction and ASCII 7-bit values for the 128 byte character string are a control operand for the SIMD instruction.

5. The method of claim 4, wherein a 128 byte non-zero result of the decode operation indicates that the 128 byte character string includes at least one character in the character class.

6. A non-transitory tangible machine-readable medium having instructions stored thereon comprising a software program or module for performing regular expression matching of a byte stream, wherein execution of the instructions on a processor of a computing system enables the computing system to:
sample a chunk of data from the byte stream, the chunk of data comprising a character string comprising n bytes;
identify a character class that includes a plurality of characters included in the character class being selected from character 0 to 256 of an American Standard Code for Information Interchange (ASCII) extended character table; and
perform a decoding operation using the character string as an input, the decoding operation to include checking, in a parallel manner, characters of the character string with an encoded mask table that includes encoded binary values for individual characters in the character class, wherein the checking of characters in the character string is to determine whether the character string includes at least one character in the character class, and wherein the encoded mask table includes 4 rows and 128 columns, high 2 bits and low 6 bits of ASCII 8-bit values for characters included in the character class are used to encode individual characters in the encoded mask table.

7. The non-transitory tangible machine-readable medium of claim 6, wherein n comprises 64 bytes, and the computing system is to execute a first 512-bit single input multiple data (SIMD) instruction and execute a second 512-bit SIMD instruction on a processor to perform the decode operation to check, in a parallel manner, characters in the character string with the encoded mask table.

8. The non-transitory tangible machine-readable medium of claim 7, wherein the first 512-bit SIMD instruction uses the 64 byte character string as a first source operand and the low 6 bits of the ASCII 8-bit values for individual characters included in the 64 byte character string as a first control operand, the second 512-bit SIMD instructions uses 16 bytes of the 64 bytes character string that correspond to the high 2 bits of the ASCII 8-bit values as a second source operand and 4 bits that correspond to each row of the encoded mask table as a second control operand.

9. The non-transitory tangible machine-readable medium of claim 8, the instructions to further cause the computing system to:
perform a logical AND of a first result from the first 512-bit SIMD instruction with a second result from the second 512-bit SIMD instruction to generate a 64 byte result for the decode operation, wherein a 64 byte non-zero result indicates that the character string includes at least one character in the character class.

10. A computing system, comprising:
a processor, coupled to memory, having a plurality of cores on which instructions are executed; and
instructions comprising a software program or module for performing regular expression matching of a byte stream, wherein execution of the instructions on the processor of the computing system enables the computing system to:
sample from a byte stream a first 64 byte chunk of data and a second 64 byte chunk of data, the first and second 64 byte chunks of data comprising a 128 byte character string;
identify a character class that includes a plurality of characters being selected from characters 0 to 127 of an American Standard Code for Information Interchange (ASCII) extended character table; and
perform a decoding operation using the 128 byte character string as an input, the decoding operation to include using 7 of 8 bits of individual bytes included in the first and second 64 byte chunks of data to check, in a parallel manner, characters of the 128 byte character string included in the first and second 64 byte chunks of data with an encoded mask table that includes encoded binary values for individual characters in the character class, wherein the checking of the characters of the 128 bytes characters string is to determine whether the 128 byte character string includes at least one character in the character class.

11. The computing system of claim 10, wherein the encoded mask table includes 1 row and 128 columns to encode the plurality of characters included in the character class.

12. The computing system of claim 11, wherein the computing system is to execute a 512-bit single input multiple data (SIMD) instruction on a processor to perform the decode operation to check, in a parallel manner, the characters of the 128 byte character string included in the first and second 64 byte chunks of data with the encoded mask table.

13. The computing system of claim 12, wherein the 128 byte character string included in the first and second 64 byte chunks of data is a source operand for the SIMD instruction and ASCII 7-bit values for the 128 byte character string are a control operand for the SIMD instruction, a 128 byte non-zero result of the decode operation to indicate that the character string includes at least one character in the character class.

* * * * *